United States Patent [19]

Ogawa

[11] Patent Number: 6,031,999
[45] Date of Patent: *Feb. 29, 2000

[54] CAMERA BATTERY CHECK DEVICE HAVING MULTIPLE BATTERY CHECK LEVELS

[75] Inventor: Hidehiro Ogawa, Funabashi, Japan

[73] Assignee: Nikon Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/900,870

[22] Filed: Jul. 25, 1997

[30] Foreign Application Priority Data

Oct. 17, 1996 [JP] Japan ................................. 8-274564

[51] Int. Cl.$^7$ ................................. G03B 13/36
[52] U.S. Cl. ........................................ 396/303; 396/277
[58] Field of Search ................................. 396/277, 278, 396/279, 301, 303

[56] References Cited

U.S. PATENT DOCUMENTS

| | | | |
|---|---|---|---|
| 4,421,396 | 12/1983 | Matsuzaki | 396/277 |
| 4,537,488 | 8/1985 | Terui | 396/277 |
| 4,547,770 | 10/1985 | Suzuki et al. | 396/301 |
| 4,992,821 | 2/1991 | Kiuchi et al. | 396/301 |
| 5,166,721 | 11/1992 | Arasaka | 396/301 |
| 5,589,912 | 12/1996 | Saiomi | 396/277 |
| 5,721,987 | 2/1998 | Ozawa | 396/277 |

*Primary Examiner*—David M. Gray
*Assistant Examiner*—Michael Dalakis

[57] ABSTRACT

A camera including a battery check device, having a plurality of battery check levels, to inactivate auxiliary devices of the camera according to a detected battery voltage level, and to modify the battery check level depending on the auxiliary devices used for taking photographs. The remaining capacity of the battery is detected and compared with the plurality of battery check levels and the activation of the plurality of devices is prohibited in a specified order, for example, in order of lower priority, or in order of larger power consumption, as the detected value of the remaining battery capacity decreases. The battery check level can be modified based on the auxiliary devices which are inactivated by an operator. A photographic operation can be continued without missing a shutter opportunity as long as a sufficient battery capacity remains to activate the devices necessary for taking photographs.

24 Claims, 3 Drawing Sheets

CAMERA BATTERY CHECK DEVICE HAVING MULTIPLE BATTERY CHECK LEVELS

CROSS-REFERENCE TO RELATED APPLICATIONS

This application is based upon and claims priority of Japanese Patent Application No. 08-274564 filed Oct. 17, 1996, the contents of which are incorporated herein by reference.

BACKGROUND OF THE INVENTION

1. Field of the Invention

The present invention relates to a battery check device, suitable for use in a camera, and, more particularly, the present invention relates to a camera including a plurality of devices which are supplied power from a battery and a battery check device having a plurality of battery check levels, which prohibits activation of the camera devices according to the detected level of the battery with respect to the plural battery check levels.

2. Description of the Related Art

In a conventional camera, electrical power is supplied from a battery to internal devices, such as a shutter device, a photometry device, an automatic focusing device, a film feeding device, a flash device, and a shake compensation device for the lens. The activation of the conventional camera is prohibited by a battery check device when the remaining capacity of the battery decreases to a level where a maximum load cannot be driven.

However, the conventional camera has a constant battery check level at which the activation of the camera is prohibited. Thus, the operation of the conventional camera is prohibited when the remaining capacity of the battery reaches a level below the constant battery check level, even if a load device with large power consumption, such as a flash device, is not used. As a result of prohibiting the operation of the conventional camera, a shutter opportunity may be missed without taking a photograph.

Further, in a conventional camera, a photographer can generally selectively prohibit the activation of the camera's auxiliary devices, such as the shake compensation device, the automatic focusing device, the flash device, and so on. In the conventional camera, however, the battery check level required to activate all devices normally is preset at a constant battery check level, and therefore the battery check level cannot be changed even if the activation of an auxiliary device is prohibited. Consequently, if the detected battery level is below the preset constant battery check level, all devices of the camera are prohibited from executing a photographic operation, even if sufficient battery capacity remains to activate the devices other than those prohibited by the photographer.

SUMMARY OF THE INVENTION

It is an object of the present invention to eliminate the above-described problems of the prior art battery check devices.

It is another object of the present invention to provide a battery check device, suitable for use in a camera including a plurality of camera devices which are supplied electrical power from a battery, and having a plurality of battery check levels to prohibit activation of the camera devices according to the power level of the battery with respect to the plural battery check levels.

It is another object of the present invention to provide a battery check device, suitable for use in a camera having a plurality of camera devices which receive electrical power from a battery, which can modify a battery check level at which activation of the camera is prohibited according to devices which are set to an inactive state by an operator.

Objects and advantages of the present invention are achieved with a battery check device, suitable for use in a camera having a plurality of devices which are activated upon receiving an electrical power supply from a battery, including a detection device to detect a remaining capacity of the battery, and a prohibition device to prohibit the activation of the plurality of devices in a specified order as the detected remaining capacity of the battery decreases. The detection device includes a plurality of battery check levels and detects the remaining capacity of the battery by comparing the respective multiple battery check levels and the terminal voltage of the battery. The prohibition device may prohibit activation of the plurality of devices in order of lower priority with respect to the necessity of the devices for performing a photographic operation. Further, the prohibition device may prohibit activation of the plurality of devices in order of greatest power consumption of the devices.

Objects and advantages of the present invention are achieved with a battery check device, suitable for use in a camera having a plurality of camera devices which receive an electrical power supply from a battery, which plurality of devices can be respectively activated or inactivated by an operator, the battery check device including a modification device to set and modify a battery check level based on the devices which have been inactivated, and a prohibition device to prohibit a photographic operation when the voltage of the battery decreases to a level less than the battery check level set by the modification device. If only one device is inactivated, the modification device changes the battery check level according to the device which is inactivated. If a plurality of devices are inactivated, the modification device changes the battery check level according to a device consuming the most electrical power among the devices that have been inactivated.

In accordance with embodiments of the present invention, in a camera having a plurality of devices that are activated upon receiving an electrical power supply from a battery, the remaining capacity of the battery is detected, and activation of the plural devices is prohibited in a specified order as the detected value of the remaining capacity of the battery decreases. The activation of the plurality of devices may be prohibited in order of the devices having lower priority. Further, the activation of the plurality of devices may be prohibited in the order of the devices having the greatest electrical power consumption. The battery has a plurality of battery check levels and the remaining capacity of the battery is detected by comparing the battery check levels and the terminal voltage of the battery.

In accordance with embodiments of the present invention, in a camera including a plurality of devices, each of which receives an electrical power supply from a battery, and each of which can be individually activated or inactivated by an operator, the battery check levels for a battery are changed based on the devices which have been set for inactivation among the plurality of devices, and a photographic operation is prohibited when the voltage of the battery decreases to a level less than the battery check level after it has been changed. The battery check level is changed according to the device that consumes the most electrical power among the devices that have been set to an inactive status.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Reference will now be made in detail to the preferred embodiments of the present invention, examples of which are illustrated in the accompanying drawings, wherein like reference numerals refer to like elements throughout.

Figure 1:
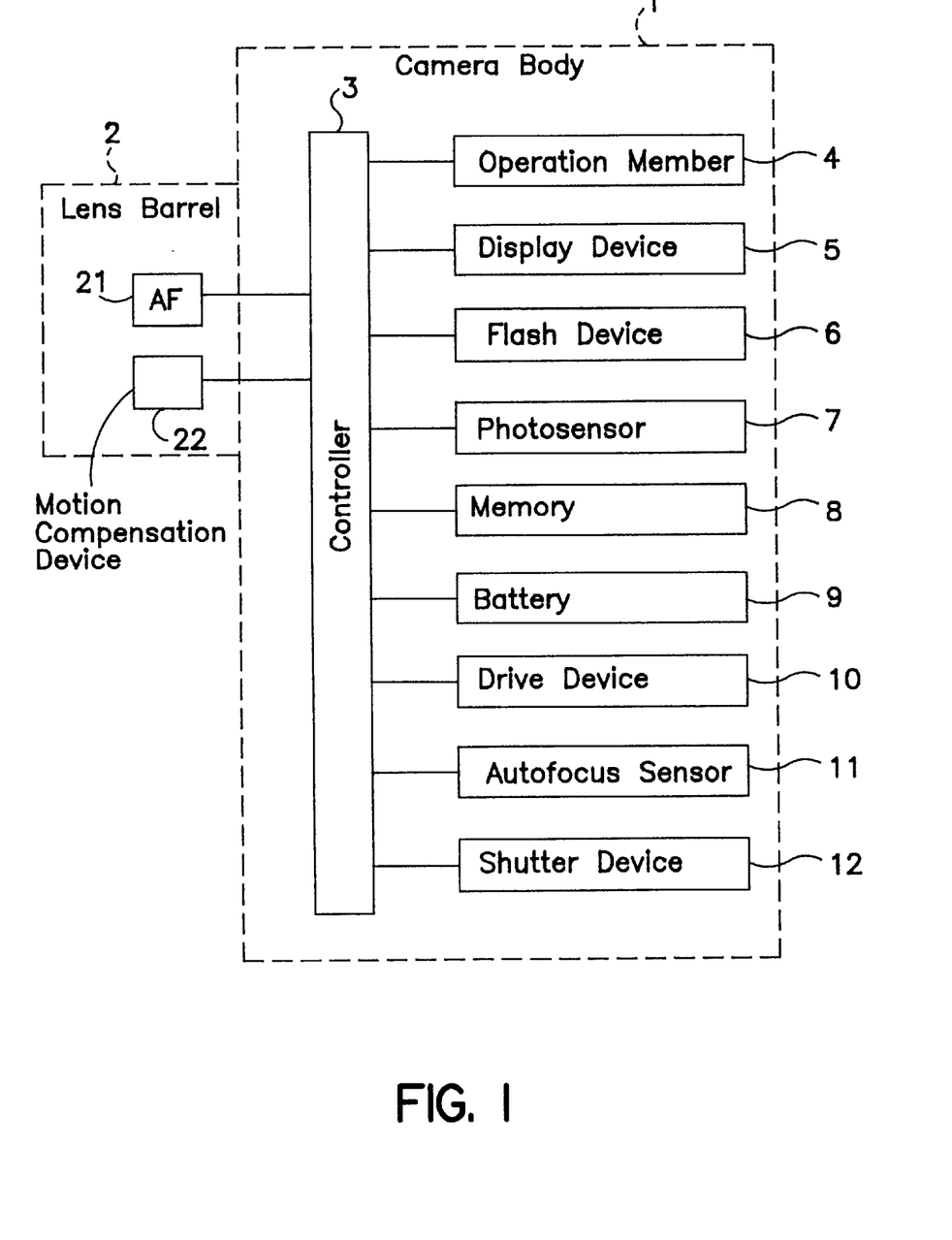
FIG. 1 is a block diagram of a camera having a battery check device in accordance with a first embodiment of the present invention.

A first preferred embodiment of the present invention will now be described below with reference to FIG. 1. As shown in FIG. 1, a camera in accordance with embodiments of the present invention includes a lens barrel 2 attached to a camera body 1. The camera body 1 comprises various devices integrated therein including a controller 3, an operation member 4, a display device 5, a flash device 6, a photosensor 7 for sensing conditions related to setting of exposure, a memory 8, a battery 9, a drive device 10, an autofocus sensor 11, and a shutter device 12. The lens barrel 2 comprises various devices integrated therein including an autofocus (AF) device 21, and a motion compensation device 22.

The controller 3 includes devices such as a microcomputer, an A/D converter, and a memory. The controller 3 provides various computation and sequence controls for the camera, and also executes an operational process to prohibit the activation of multiple devices in a specified order as the remaining capacity of the battery 9 decreases, as will be described in detail hereinbelow. Furthermore, the drive device 10 is a device that feeds the film. The motion compensation device 22 drives a camera motion compensation lens (not shown) upon detecting camera motion, such as motion generated by a photographer's hand shake.

Among the devices integrated into the camera body 1 and lens barrel 2, the shutter device 12 is essential for taking photographs. The display device 5, the flash device 6, the drive device 10, the autofocus device 21, and the motion compensation device 22 are auxiliary devices that provide auxiliary functions for taking photographs. These auxiliary devices are integrated in most of the currently available cameras, thereby substantially increasing the consumption of electrical power.

As discussed above, the conventional camera prohibits the operation of the camera when the remaining capacity of the battery decreases to a level which is less than a battery level capable of driving all of the auxiliary devices. However, even if the remaining power capacity of the battery 9 is detected to be below the level at which activation is prohibited, there are instances of camera operation when it may still be possible to take photographs by activating the shutter device 12. For example, if the flash device 6 is not used, it may still be possible to take photographs by activating the shutter device 12 even when the remaining capacity of the battery 9 is below the activation prohibition level.

Thus, in accordance with the first embodiment of the present invention, the devices integrated into the camera are prioritized with respect to how essential they are for photography from lowest priority to highest priority. The activation of the devices which are not essential for taking photographs is inhibited in order of priority of the devices, starting with the devices having the lowest priority. Moreover, in accordance with the first embodiment of the present invention, the remaining capacity of the battery 9 is determined according to the terminal voltage of the battery 9.

Of the auxiliary devices in the camera shown in FIG. 1, the motion compensation device 22 includes an acceleration sensor (not shown) and a motor (not shown). It is necessary to constantly supply electrical power to the acceleration sensor and motor, since the motion compensation device 22 detects the movement of the camera caused, e.g., by hand shake, with the acceleration sensor and compensates for camera motion by driving a compensation lens group (not shown) with the motor. Therefore, the motion compensation device 22 consumes a great amount of electrical power from the battery 9. However, the motion compensation device 22 is not considered essential for taking photographs because the effects of camera motion can be reduced, or prevented, by increasing the shutter speed or by using a tripod. Therefore, prohibiting the activation of the motion compensation device 22 does not hinder photographic operation as long as a proper motion compensation measure is taken.

Similarly, photographic operations can still be carried out by modifying photographic conditions, or by using a manual operation, even if the activation of the flash device 6, the drive device 10, or the autofocus device 21 is prohibited.

Figure 2:
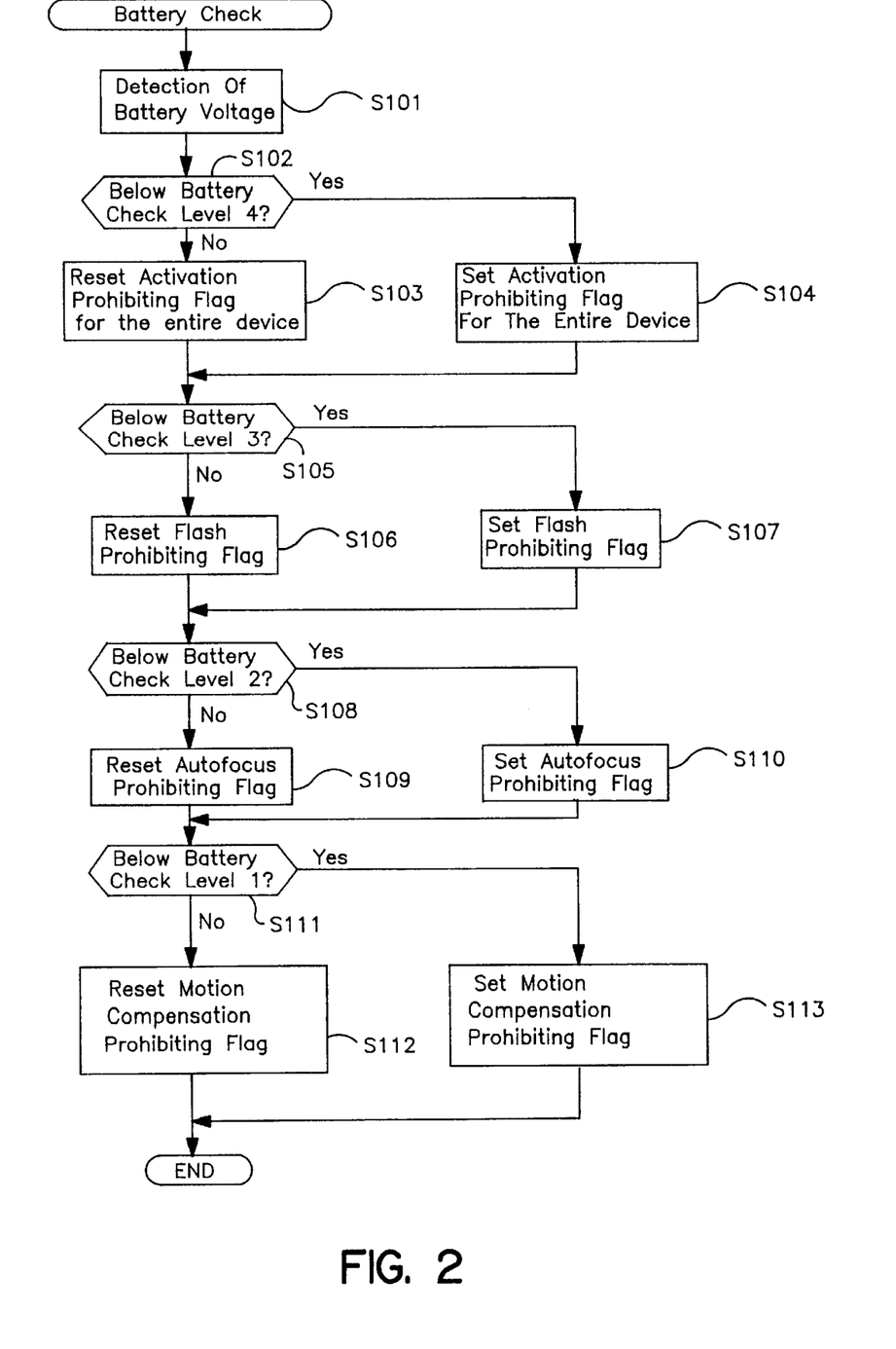
FIG. 2 is a flowchart of an operational process for performing a battery check with a battery check device in accordance with the first embodiment of the present invention.

FIG. 2 is a flowchart showing an operational process for performing a battery check in accordance with the first embodiment of the present invention.

In accordance with the first embodiment of the present invention, four battery check levels (LEVEL 1>LEVEL 2>LEVEL 3>LEVEL 4) are provided in order to check the voltage of the battery 9. Battery check LEVEL 1 corresponds to a condition in which the battery 9 power is least consumed among the four battery check levels. If the voltage of the battery 9 decreases to less than the LEVEL 1, the operation of motion compensation device 22 is prohibited and the photographic operation is carried out by using devices other than motion compensation device 22. If the voltage of the battery 9 decreases to less than battery check LEVEL 2, the operation of the autofocus device 21 is prohibited, in addition to prohibiting operation of the motion compensation device 22, and the photographic operation is carried out by using devices other than the motion compensation device 22 and the autofocus device 21. Furthermore, if the voltage of the battery 9 decreases to less than battery check LEVEL 3, the operation of the flash device 6 is prohibited, in addition to prohibiting operation of the motion compensation device 22 and the autofocus device 21, and the photographic operation is carried out by using devices other than the motion compensation device 22, autofocus device 21, and flash device 6. The battery check LEVEL 4 corresponds to a condition in which the battery 9 power is most heavily consumed among the four battery check levels. If the voltage of the battery 9 decreases to less than the LEVEL 4, the respective operations of all devices in the camera are prohibited, including the operation of the shutter device 12. Thus, the respective operations of the auxiliary devices are prohibited in order of priority as the voltage of the battery 9 decreases to a point lower than the check levels. The controller 3 repeatedly executes the battery check operational process of FIG. 2 as long as the electrical power for the camera is turned on.

Referring now to the flowchart of FIG. 2, in step S101, the terminal voltage of the battery 9 is entered to the controller 3 via an A/D converter (not shown). In step S102, it is determined whether or not the detected voltage of the battery 9 is less than battery check LEVEL 4. If the voltage of the battery 9 has decreased to less than battery check LEVEL 4, the operational process proceeds to step S104, and an activation prohibiting flag for the entire device is set. However, if the voltage of the battery 9 has not decreased to less than LEVEL 4, the operational process proceeds to step S103, and the activation prohibiting flag for the entire device is reset.

Next, in step S105, it is determined whether or not the voltage of the battery 9 is less than battery check LEVEL 3. If the voltage of the battery 9 is below LEVEL 3, the operational process proceeds to step S107, and the flash prohibiting flag is set. However, if the voltage of the battery 9 is not less than LEVEL 3, the operational process proceeds to step S106, where the flash prohibiting flag is reset. Although it is not necessary to prohibit the entire operation of the camera if the voltage of the battery 9 is below LEVEL 3, but higher than LEVEL 4, at least the operation of the shutter device 12 can be guaranteed by prohibiting the activation of the motion compensation device 22, the autofocus device 21, and the flash device 6, thereby enabling photographic operation.

In step S108, it is determined whether or not the voltage of the battery 9 is below battery check LEVEL 2. If the voltage of the battery 9 is below LEVEL 2, the operational process proceeds to step S110, and the autofocus prohibiting flag is set. However, if the voltage of the battery 9 has not decreased below LEVEL 2, the operational process proceeds to step S109, and the autofocus prohibiting flag is reset. If the voltage of the battery 9 is below LEVEL 2 but higher than LEVEL 3, the operation of at least the flash device 6 and the shutter device 12 can be guaranteed by prohibiting the operation of both the motion compensation device 22 and the autofocus device 21, thereby enabling photographic operation.

Continuing, in step S111, it is determined whether or not the voltage of the battery 9 is below battery check LEVEL 1. If the voltage of the battery 9 is below check LEVEL 1, the operational process proceeds to step S113, and a motion compensation operation prohibiting flag is set. However, if the voltage of the battery 9 has not decreased below LEVEL 1, the operational process proceeds to step S112, and the motion compensation operation prohibiting flag is reset. If the voltage of the battery 9 is below battery check LEVEL 1 but higher than LEVEL 2, prohibiting the activation of the motion compensation device 22 guarantees the operation of all other devices, thereby enabling photographic operation.

As discussed above, because battery check LEVEL 4 is the level where the battery 9 is most heavily consumed, all activation prohibiting flags for all devices are set if the voltage of the battery 9 is below LEVEL 4, including a flag for prohibiting the entire device from activation. If the voltage of the battery 9 has recovered, the activation prohibiting flags are reset pursuant to the detected voltage of the battery 9, thereby enabling the activation of the devices according to the terminal voltage level of the battery 9.

If an activation prohibiting flag is set for a device by the operational process shown in FIG. 2, the activation of the device for which the activation prohibiting flag is set is prohibited, while activation is permitted for the device for which an activation prohibiting flag is reset.

In accordance with embodiments of the present invention, a photographic operation can be continued without missing a shutter opportunity by establishing the multiple battery check levels and by defining priorities for auxiliary devices such that their activation will be prohibited in order of lower priority to higher priority as the detected voltage of the battery 9 decreases below each battery check level. Accordingly, a photographic operation can be continued without missing a shutter opportunity as long as sufficient power capacity remains in the battery.

In accordance with the above-described first embodiment of the present invention, four battery check levels are provided and the activation of auxiliary devices is prohibited in order of the priorities of the devices, from the lowest priority device to the highest priority device, as the voltage of the battery 9 decreases below each check level. However, the number of battery check levels is not limited to just four levels, and a greater number of check levels or fewer check levels is possible. Further, prohibition of the activation of the auxiliary devices is not limited to prohibiting the activation of a single device when the battery voltage decreases below a certain check level, and the activation of multiple devices can be prohibited at each check level.

Moreover, in accordance with the first embodiment of the present invention, an example has been shown and described wherein the activation of the auxiliary devices is prohibited according to the priority ordering of the devices as the voltage of the battery 9 decreases below a battery check level. However, the present invention is not limited to prohibiting activation of the auxiliary devices in order of lower priority, and the activation of the auxiliary devices can be prohibited in order of the amount of electrical power the auxiliary device consumes. That is, the activation of the auxiliary devices is prohibited in order of the device having the greatest consumption of electrical power.

Figure 3:
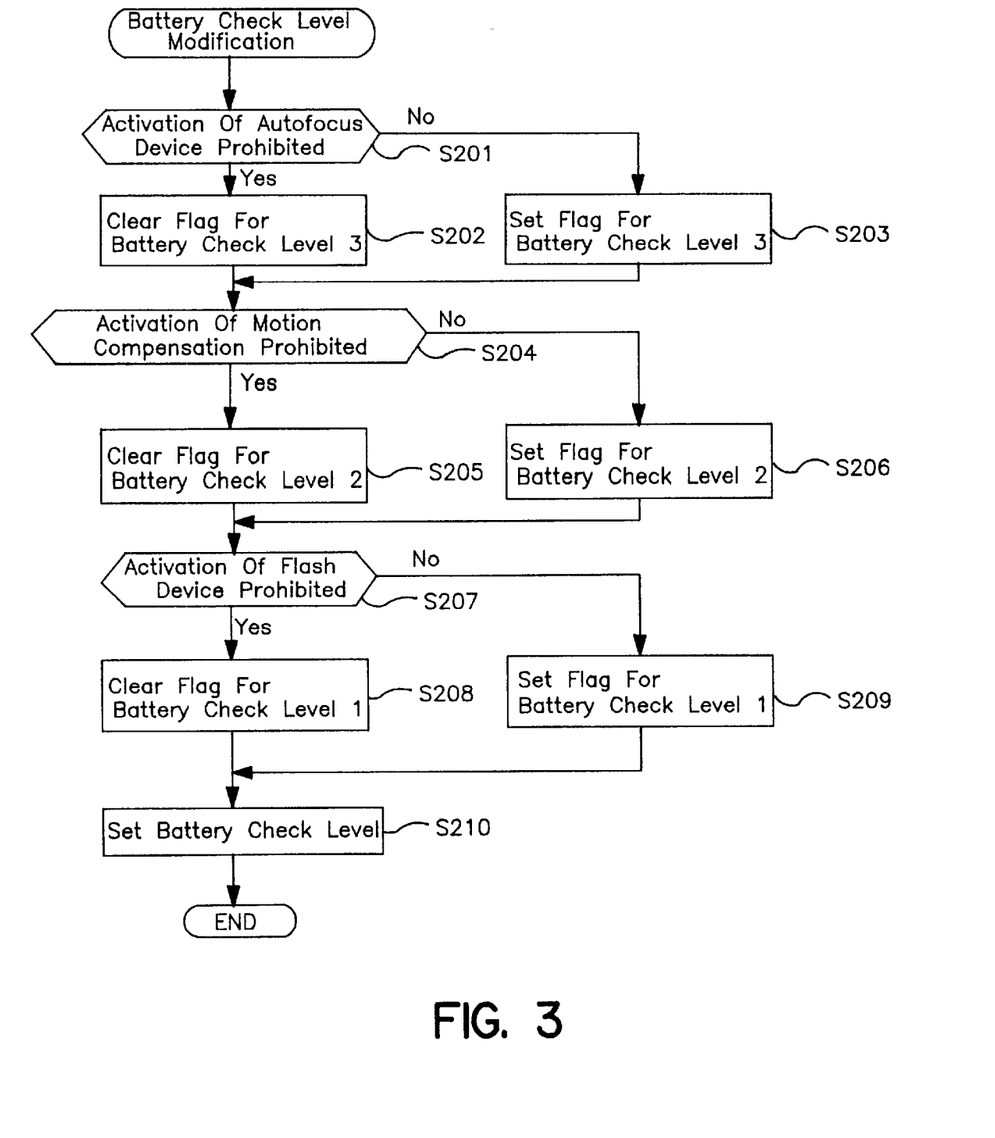
FIG. 3 is a flowchart of an operational process for performing a battery check with a battery check device in accordance with a second embodiment of the present invention.

A second preferred embodiment of the present invention will be described below with reference to FIG. 3. In accordance with the second embodiment of the present invention, if the photographer prohibits activation of an auxiliary device or devices, the battery check levels are modified according to the device or devices for which activation is prohibited. Further, in accordance with the second embodiment of the present invention, an explanation is provided using the flash device 6, the autofocus device 21 and the motion compensation device 22 as examples of auxiliary devices. Among these auxiliary devices, the flash device 6 has the greatest power consumption, followed in order of decreasing power consumption by the motion compensation device 22, and the autofocus device 21.

Furthermore, in accordance with the second embodiment of the present invention, battery check LEVEL 1 is a level at which at least the shutter device 12 and the flash device 6 can be activated. Since the flash device 6 has the greatest power consumption among all auxiliary devices, the remaining capacity of the battery 9 must be greatest in order to activate the flash device 6. Therefore, battery check LEVEL 1 is the highest level (LEVEL 1>LEVEL 2>LEVEL 3). Battery check LEVEL 2 is a level at which at least the shutter device 12 and the motion compensation device 22 can be activated. Battery check LEVEL 3 is a level at which at least the shutter device 12 and the autofocus device 21 can be activated. Since the autofocus device 21 consumes the least amount of electrical power among all the auxiliary devices, at least the shutter device 12 and the autofocus device 21 can be activated when the remaining capacity of battery 9 is at its lowest. Thus, battery check LEVEL 3 is the lowest level. Nevertheless, if the voltage of the battery 9 decreases below battery check LEVEL 3, the camera's photographic operation becomes prohibited since the operation of the shutter device 12 cannot be guaranteed.

The operation of the second embodiment of the present invention will now be described with reference to FIG. 3, which is a flowchart illustrating an operational process to modify a battery check level. The second embodiment of the present invention includes elements which are identical to those of the first embodiment shown in FIG. 1, and a description of the identical elements will not be repeated here. The controller 3 repeatedly executes the battery check level modification operational process shown in FIG. 3 as long as the electrical power for the camera is turned on.

In step S201, it is determined whether or not an auto/manual changing switch (not shown) of the autofocus device 21 is set for manual mode operation to prohibit the activation of autofocus device 21. If the activation of autofocus device 21 is prohibited, the operational process proceeds to step S202, and the battery check LEVEL 3 flag is cleared. However, if the activation of the autofocus device 21 is not prohibited, the operational process proceeds to step S203, and the battery check LEVEL 3 flag is set.

In step S204, it is determined whether or not an ON/OFF switch (not shown) of the motion compensation device 22 is switched off to prohibit the activation of the motion compensation device 22. If the activation of the motion compensation device 22 is prohibited, the operational process proceeds to step S205, and the battery check LEVEL 2 flag is cleared. However, if the activation of motion compensation device 22 is not prohibited, the operational process proceeds to step S206, and the battery check LEVEL 2 flag is set.

Continuing, in step S207, it is determined whether or not an ON/OFF switch (not shown) of the flash device 6 is switched off to prohibit the activation of the flash device 6. If the activation of flash device 6 is prohibited, the operational process proceeds to step S208, and the battery check LEVEL 1 flag is cleared. However, if the activation of the flash device 6 is not prohibited, the operational process proceeds to step S209, and the battery check LEVEL 1 flag is set.

In step S210, the battery check levels are set according to the setting conditions of the battery check flags. More specifically, if any one of the battery check level flags is set, the battery check level is determined as the level set by the flag, and if multiple flags are set, the battery check level is determined as the level with the lowest numerical value. For example, if the LEVEL 1 flag and LEVEL 3 flag are set at the same time, LEVEL 1, a level with a lower numerical value, is set as the battery check level.

If the terminal voltage of battery 9 decreases below the battery check level that has been set by the operational process shown in FIG. 3, the camera's photographic operation is prohibited.

In accordance with the second embodiment of the present invention, the check level of the battery may be modified, depending on the devices for which activation is prohibited. Accordingly, when a photographer prohibits the activation of certain auxiliary devices, a photographic operation can be continued without missing a shutter opportunity, even when it is not possible to activate an entire device due to the low capacity of the battery. Thus, if the battery capacity is low, a photograph can still be taken by prohibiting the activation of devices which are not necessary, depending on the photographic requirements, and using the least number of auxiliary devices necessary for taking photographs.

In accordance with embodiments of the present invention, the remaining power capacity of a battery is detected, and the activation of multiple devices which are provided power by the battery is prohibited in a specified order. For example, the activation of the multiple devices can be prohibited in order of lower priority, or in order of larger power consumption, as the detected value of the remaining battery power capacity decreases. Thus, a photographic operation can be continued without missing a shutter opportunity as long as sufficient level of power capacity remains in order to activate the devices necessary for taking photographs.

Moreover, in accordance with embodiments of the present invention, the battery check levels can be modified depending on a device that has been set to an inactive status among multiple devices, and a photographic operation is prohibited if the voltage of the battery decreases below the battery check level after modification of the battery check level. Therefore, a photographic operation can be continued without missing a shutter opportunity with the use of the minimal number of devices necessary for taking photographs by prohibiting the activation of devices that are not mandatory depending on the photographic requirements. Thus, even when it is not possible to activate the entire device due to the low capacity of the battery, a photographic operation can be performed by prohibiting activation of unnecessary devices and modifying the battery check level according to the devices for which activation is prohibited.

Although a few preferred embodiments of the present invention have been shown and described, it will be appreciated by those skilled in the art that changes may be made in these embodiments without departing from the principals and spirit of the invention, the scope of which is defined in the claims and their equivalents.

What is claimed is:

1. A battery check device for a camera having a plurality of devices which are activated upon receiving an electrical power supply from a battery, comprising:

a detection device to detect a remaining capacity of the battery; and     a prohibition device to prohibit the activation of at least one of the plurality of devices, wherein the prohibition device selects the number and types of the plurality of devices whose activation is prohibited according to the detected remaining capacity of the battery,     and wherein the prohibition device stores predetermined respective levels of priority assigned to the respective of devices, the predetermined levels being from a lowest priority level to a highest priority level, and the prohibition device prohibits operation of the respective devices in order of the device assigned the lowest priority level to a device assigned the highest priority level as the detected remaining capacity of the battery decreases.

2. A battery check device as recited in claim 1, wherein the detection device detects the remaining capacity of the battery by comparing a plurality of battery check levels with the terminal voltage of the battery.

3. A battery check device as recited in claim 1, wherein the plurality of devices include a flash device, an autofocus device and a motion compensation device, and the motion compensation device is assigned the lowest priority, the autofocus device is assigned the next lowest priority and the flash device is assigned the highest priority.

4. A battery check device as recited in claim 2, wherein the prohibition device prohibits activation of a single device each time the battery voltage decreases below a battery check level.

5. A battery check device as recited in claim 2, wherein the prohibition device prohibits activation of a plurality of devices each time the battery voltage decreases below a battery check level.

6. A battery check device as recited in claim 2, wherein the plurality of devices include a motion compensation device, an autofocus device and a flash device, and the plurality of battery check levels include a first level, a second level, a third level and a fourth level, wherein the operation of the motion compensation device is prohibited when the voltage of the battery decreases to less than the first level, the operation of the autofocus device is prohibited when the voltage of the battery decreases to less than the second level, the operation of the flash device is prohibited when the voltage of the battery decreases to less than the third level, and the operation of all devices is prohibited when the voltage of the battery decreases to less than the fourth level.

7. A battery check device for a camera having a plurality devices which receive an electrical power supply from a battery, which plurality of devices can be respectively activated or inactivated, comprising:

a modification device to determine whether each respective device of the plurality of devices is activated or inactivated and to set a battery check level based on the devices which are activated and based on the devices which are inactivated; and a prohibition device to prohibit a photographic operation when the voltage of the battery decreases to a level less than the battery check level set by the modification device, wherein the modification device changes the battery check level to a level at which a device can operate, the device being a device consuming the most electrical power among the devices that have been activated if a plurality of devices are activated.

8. A battery check device as recited in claim 7, wherein the modification device changes the battery check level according to a device which is activated if only one device is activated.

9. A battery check device as recited in claim 7, wherein the plurality of devices include a flash device, an autofocus device and a motion compensation device, and the flash device has the highest power consumption followed in order of decreasing power consumption by the motion compensation device and the autofocus device.

10. A battery check device as recited in claim 9, further comprising:

a shutter device, wherein the modification device sets one of a first battery check level, a second battery check level and a third battery check level, and the first battery check level is a level at which at least the shutter device and the flash device can be activated, the second battery check level is a level at which at least the shutter device and the motion compensation device can be activated, and the third battery check level is a level at which at least the shutter device and the autofocus device can be activated.

11. A camera, comprising:

a battery;

a shutter device which is activated upon receiving an electrical power supply from the battery;

a plurality of devices, other than the shutter device, which are activated upon receiving an electrical power supply from the battery;

a detection device to detect a battery voltage level;

a prohibiting device to prohibit activation of at least one of the plurality of devices according to a voltage level detected by the detection device, the prohibiting device including a storage device to store predetermined respective levels of priority assigned to the respective devices, the predetermined levels being from a lowest priority level to a highest priority level, the prohibiting device prohibiting activation of the plurality of devices in order of the device having the lowest priority level to the device having the highest priority level as the detected battery voltage decreases; and a control device to control activation of the shutter device based on the detected battery voltage level and the devices whose activation is prohibited by the prohibiting device.

12. A camera as recited in claim 11, further comprising:

a battery check level setting device to set a battery check level based on the devices whose activation is prohibited by the prohibiting device, wherein the battery check level setting device sets a minimum battery check level which allows the shutter device to be activated.

13. A camera as recited in claim 11, wherein the prohibiting device prohibits activation of the plurality of devices according to the battery voltage level detected with respect to a plurality of battery voltage check levels.

14. A battery check device for a camera having a plurality devices which are activated upon receiving an electrical power supply from a battery, comprising:

a detection device to detect a remaining capacity of the battery; and a prohibition device to prohibit the activation of the plurality of devices in order of lower priority as the detected remaining capacity of the battery decreases, wherein the plurality of devices include a flash device, an autofocus device and a motion compensation device, and the motion compensation device has the lowest priority, the autofocus device has the next lowest priority and the flash device has the highest priority.

15. A battery check device for a camera having a plurality devices which are activated upon receiving an electrical power supply from a battery, comprising:

a detection device to detect a remaining capacity of the battery by comparing a plurality of battery check levels with the terminal voltage of the battery; and a prohibition device to prohibit the activation of the plurality of devices in a specified order as the detected remaining capacity of the battery decreases, wherein the plurality of devices include a motion compensation device, an autofocus device and a flash device, and the plurality of battery check levels include a first level, a second level, a third level and a fourth level, wherein the operation of the motion compensation device is prohibited when the voltage of the battery decreases to less than the first level, the operation of the autofocus device is prohibited when the voltage of the battery decreases to less than the second level, the operation of the flash device is prohibited when the voltage of the battery decreases to less than the third level, and the operation of all devices is prohibited when the voltage of the battery decreases to less than the fourth level.

16. A battery check device for a camera having a plurality devices which receive an electrical power supply from a battery, which plurality of devices can be respectively activated or inactivated, comprising:

a modification device to set a battery check level based on the devices which have been inactivated, wherein the modification device changes the battery check level according to a device consuming the most electrical power among the devices that have been inactivated if a plurality of devices are inactivated; and a prohibition device to prohibit a photographic operation when the voltage of the battery decreases to a level less than the battery check level set by the modification device, wherein the plurality of devices include a shutter device, a flash device, an autofocus device and a motion compensation device, and the flash device has the highest power consumption followed in order of decreasing power consumption by the motion compensation device and the autofocus device, and wherein the modification device sets one of a first battery check level, a second battery check level and a third battery check level, and the first battery check level is a level at which at least the shutter device and the flash device can be activated, the second battery check level is a level at which at least the shutter device and the motion compensation device can be activated, and the third battery check level is a level at which at least the shutter device and the autofocus device can be activated.

17. A battery check device for a camera having a plurality of devices which are activated upon receiving an electrical power supply from a battery, comprising:

a detection device to detect a remaining capacity of the battery; and a prohibition device to prohibit the activation of at least one of the plurality of devices, wherein the prohibition device selects the number and types of the plurality of devices whose activation is prohibited in a specified order corresponding to the detected remaining capacity of the battery, the specified order being from a device having a greatest power consumption to a device having a lowest power consumption.

18. A battery check device as recited in claim 17, wherein the plurality of devices include a flash device, an autofocus device and a motion compensation device, and the flash device has the greatest power consumption, the motion compensation device has the next greatest power consumption, and the autofocus device has the lowest power consumption.

19. A camera, comprising:

a battery;

a shutter device which is activated upon receiving an electrical power supply from the battery;

a plurality of devices, other than the shutter device, which are activated upon receiving an electrical power supply from the battery;

a detection device to detect a battery voltage level;

a prohibiting device to prohibit activation of at least one of the plurality of devices according to a voltage level detected by the detection device, the prohibiting device prohibiting activation of the plurality of devices in a specified order corresponding to the voltage level detected the detection device, the specified order being from a device having a greatest power consumption to a device having a lowest power consumption; and a control device to control activation of the shutter device based on the detected battery voltage level and the devices whose activation is prohibited by the prohibiting device.

20. A method of operation of a system including a battery for supplying power to a plurality of devices, comprising the steps of:

setting predetermined respective levels of priority corresponding to the respective devices, the predetermined levels of priority ranging from a lowest priority level to a highest priority level;

setting a plurality of battery check levels;

detecting a remaining capacity of the battery;

comparing the detected remaining capacity of the battery with each of the plurality of battery check levels; and prohibiting activation of at least one of the plurality of devices in order of the lowest priority device to the highest priority device as the result of the comparison between the remaining capacity of the battery and the battery check levels indicates that the remaining capacity of the battery is decreasing.

21. A method of setting a battery check level for a battery which supplies power to a plurality of devices, which plurality of devices are respectively activated by supplying power from the battery or inactivated by stopping supply of power from the battery, comprising the steps of:

determining whether each of the respective devices of the plurality of devices are activated;

setting respective battery check levels corresponding to each respective device which is determined to be activated;

setting a battery check level corresponding to the highest battery check level set among the activated devices; and prohibiting a photographic operation in response to the voltage of the battery decreasing to a level less than the set battery check level.

22. A battery check device for a camera having a plurality of devices which are activated upon receiving an electrical power supply from a battery, comprising:

a detection device to detect a remaining capacity of the battery; and a prohibition device to prohibit activation of at least one of the plurality of devices, wherein the prohibition device selects the number and types of the plurality of devices whose activation is prohibited in a specified order corresponding to the detected remaining capacity of the battery, wherein the specified order being from a lowest priority device to a highest priority device with respect to how essential the respective device is for photography, and wherein the plurality of devices include a flash device, an autofocus device and a motion compensation device, and the motion compensation device has the lowest priority, the autofocus device has the next lowest priority and the flash device has the highest priority.

23. A battery check device for a camera having a plurality of devices which are activated upon receiving an electrical power supply from a battery, comprising:

a detection device to detect a remaining capacity of the battery; and a prohibition device to prohibit the activation of at least one of the plurality of devices, wherein the prohibition device selects the number and types of the plurality of devices whose activation is prohibited in a specified order corresponding to the detected remaining capacity of the battery, the specified order being from a lowest priority device to highest priority device with respect to how essential the respective device is for photography, wherein the detection device detects the remaining capacity of the battery by comparing a plurality of battery check levels with the terminal voltage of the battery, and wherein the plurality of devices include a motion compensation device, an autofocus device and a flash device, and the plurality of battery check levels include a first level, a second level, a third level and a fourth level, wherein the operation of the motion compensation device is prohibited when the voltage of the battery decreases to less than the first level, the operation of the autofocus device is prohibited when the voltage of the battery decreases to less than the second level, the operation of the flash device is prohibited when the voltage of the battery decreases to less than the third level, and the operation of all devices is prohibited when the voltage of the battery decreases to less than the fourth level.

24. A battery check device for a camera having a plurality of devices which are activated by receiving power from a battery, including an exposure device to perform exposure, comprising:

a detection device to detect a remaining capacity of the battery;

a prohibition device to compare the detected remaining capacity of the battery with a first battery check level and a second battery check level, to prohibit activation of a first of the plurality of devices, while permitting an exposure operation, if the detected remaining capacity of the battery is less than the first battery check level, and to prohibit activation of a second of the plurality of devices, while permitting the exposure operation if the detected remaining capacity of the battery is less than the second battery check level.

* * * * *